Jan. 25, 1966  J. W. DONNELLY  3,231,355
LONG STROKE SINGLE GOB GLASSWARE FORMING MACHINE
Filed Oct. 12, 1960  4 Sheets-Sheet 1

INVENTOR.
JOSEPH W. DONNELLY
BY Arthur H. Seidel
ATTORNEY

INVENTOR.
JOSEPH W. DONNELLY
BY Arthur H. Seidel
ATTORNEY

Jan. 25, 1966     J. W. DONNELLY     3,231,355
LONG STROKE SINGLE GOB GLASSWARE FORMING MACHINE
Filed Oct. 12, 1960     4 Sheets-Sheet 3
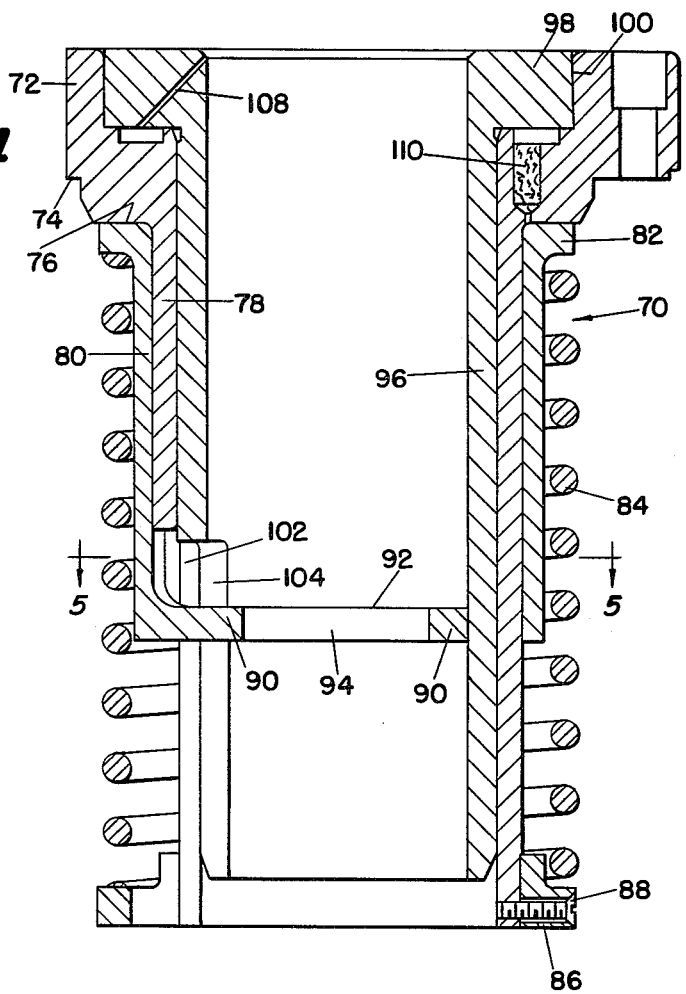
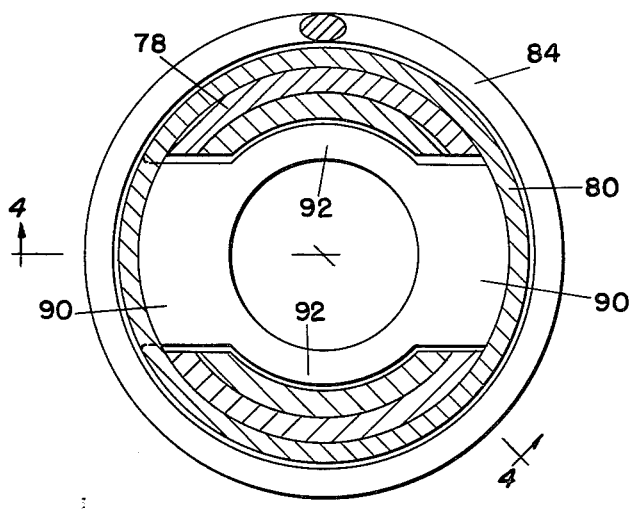
INVENTOR.
JOSEPH W. DONNELLY
ATTORNEY

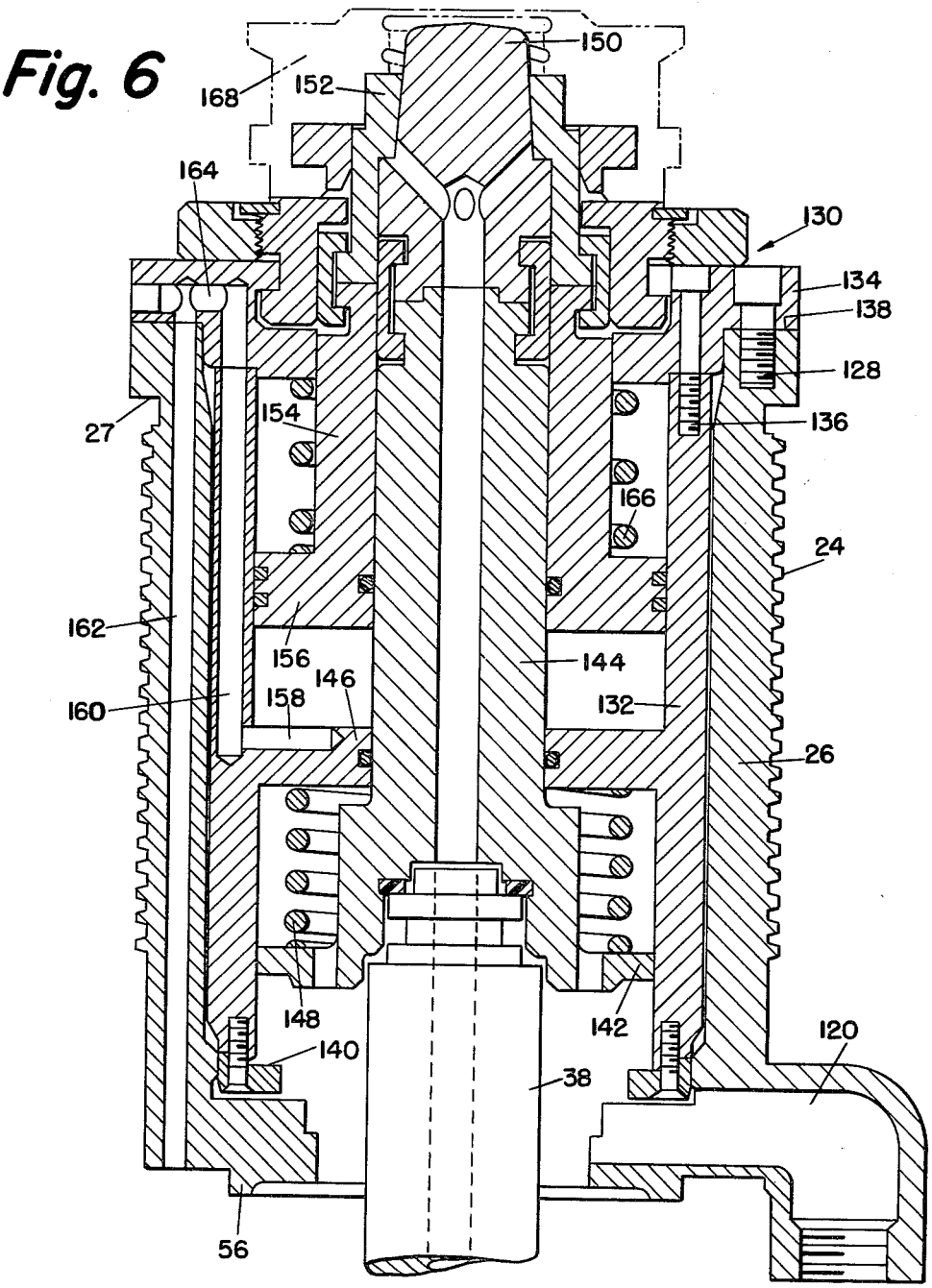

United States Patent Office 3,231,355
Patented Jan. 25, 1966

1

3,231,355
LONG STROKE SINGLE GOB GLASSWARE FORMING MACHINE
Joseph W. Donnelly, Vineland, N.J., assignor to Maul Brothers, Inc., Millville, N.J., a corporation of New Jersey
Filed Oct. 12, 1960, Ser. No. 62,197
8 Claims. (Cl. 65—167)

This invention relates to glassware forming machines, and more particularly, to glassware forming machines having a reciprocal plunger whose stroke is appreciably longer than the stroke existing heretofore and capable of being used on existing glass forming machines.

Glassware machinery can operate by what is known as the press-and-blow method and also by what is known by the blow-and-blow method. These two methods are well known to those skilled in the art and need not be described in detail. The press-and-blow method is described in U.S. Patent 2,508,891. The blow-and-blow method of forming glassware is explained in U.S. Patent 2,402,234.

The present invention is particularly directed toward increasing the plunger stroke while providing cylinders for the plunger, which cylinders are capable of being utilized in existing glassware forming machinery. Heretofore, it has been conventional to support the cylinder by a mechanism extending downwardly from the cylinder bottom cap, which mechanism rests on a planar surface of the frame of the glassware forming machinery. For example, see U.S. Patent 2,508,890. The plunger in said last mentioned patent has a stroke of approximately six and one-half inches.

The plunger cylinder of the present invention is adapted to be substituted for the plunger cylinder in said last mentioned patent, while at the same time providing a plunger cylinder wherein the plunger has a stroke of approximately eight and one-half inches. A longer plunger stroke is desirable since it increases the range of the glassware which may be formed and also permits the parison to be designed to suit the glassware rather than being limited by the stroke of the plunger. A longer plunger stroke also permits a more uniform thickness in the parison so as to thereby have more control over the thickness of the bottom of the glassware. In addition, an increased plunger stroke will permit existing glassware forming machinery to make taller glassware.

It is an object of the present invention to provide a novel glassware forming machine having a cartridge means removable as a unit for converting the machine from a press-and-blow method to a blow-and-blow method, and vice versa.

It is another object of the present invention to provide a glassware forming machine having a long stroke single gob plunger mechanism supported by an adjusting means positioned so as to contact the top cylinder cap for supporting the cylinder in depending relation and adjustment thereof in an axial direction.

It is another object of the present invention to provide a novel glassware forming machine wherein the plunger stroke has been increased from about six and one-half inches to about eight and one-half inches, while being capable of being fitted into a standard glassware forming machine.

It is still another object of the present invention to provide a novel plunger mechanism having a long stroke and supported in depending relation from an adjustment means which is in engagement with the outer periphery of the top cylinder cap.

Other objects will appear hereinafter.

For the purpose of illustrating the present invention there is shown in the drawings a form which is presently preferred; it being understood, however, that this invention is not limited to the precise arrangements and instrumentalities shown.

FIGURE 4 is a sectional view of the plunger positioner unit which is capable of being used with the mechanism shown in FIGURE 1, and taken along the lines 4—4 in FIGURE 5.

FIGURE 5 is a sectional view taken along the lines 5—5 in FIGURE 4.

FIGURE 6 is a longitudinal sectional view of the top cylinder cap in FIGURE 1 modified so as to form glassware by the blow-and-blow method.

Referring to the drawing in detail, wherein like numerals indicate like elements, there is shown in FIGURE 1 a long stroke single gob plunger mechanism for a press-and-blow operation designated generally as 10.

Figure 1:
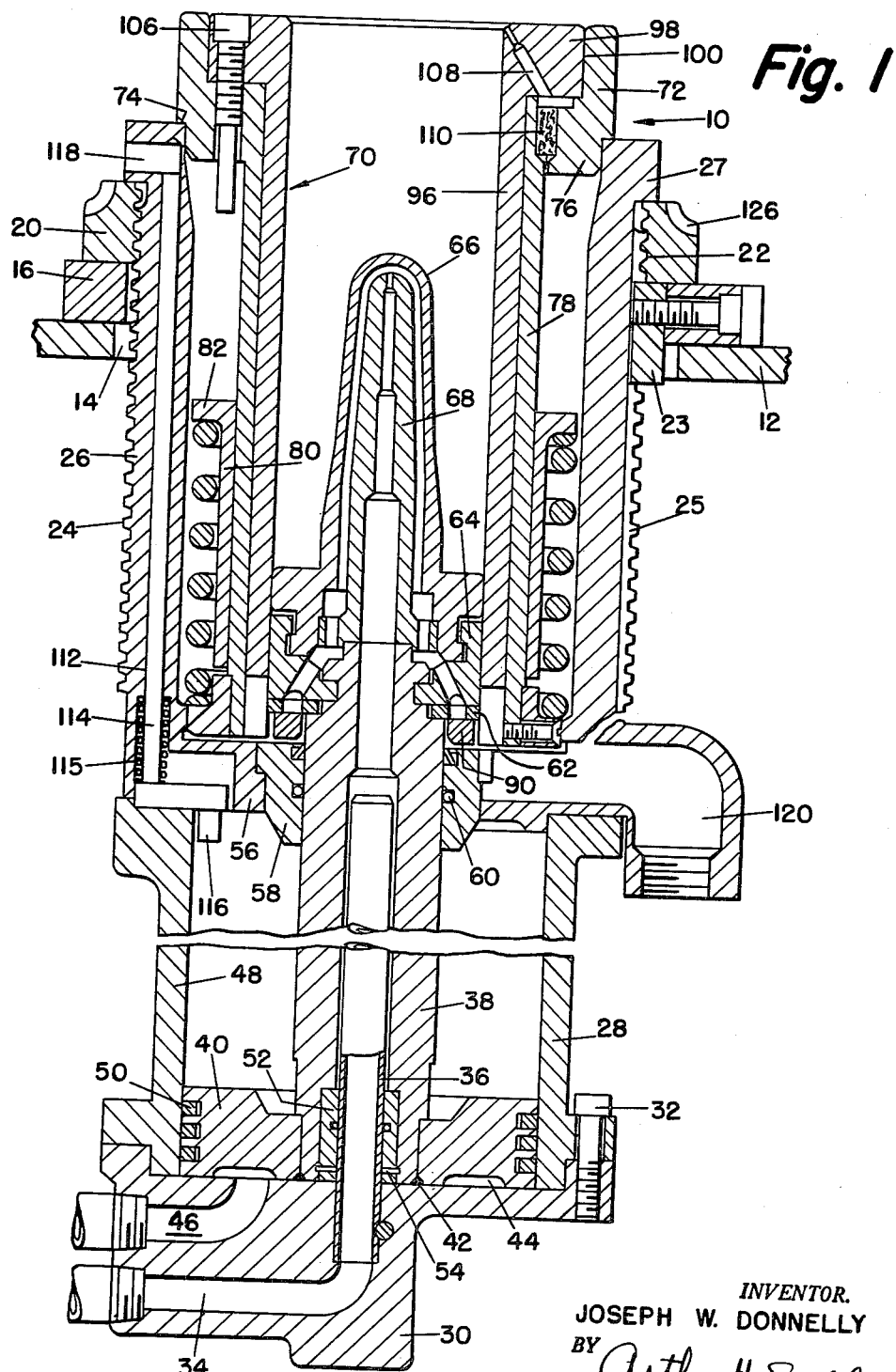
FIGURE 1 is a longitudinal sectional view of the novel plunger mechanism of the present invention.

The plunger mechanism 10 is supported in depending relation from a horizontally disposed frame 12. The plunger mechanism 10 extends through a hole 14 in the frame 12. A plunger plate 16 is mounted on the uppermost surface of the frame 12 and fixedly secured thereto in any convenient manner such as by bolts (not shown) which extend through the holes 18 in the plunger plate 16.

A ring gear 20 is disposed on the uppermost planar surface of the plunger plate 16 and is provided with threads 22 on its internal surface. The threads 22 on the ring gear 20 are meshingly engaged with threads 24 on the outer periphery of the top cylinder cap 26. A key 23 is fixedly secured to the plunger plate 16 and rides within a slot 25 on the outer periphery of the top cylinder cap 26. The slot 25 extends through the threads 24 and the cooperation between the key 23 and the slot 25 prevents the top cylinder cap 26 from rotating. The upper open end of the top cylinder cap 26 is provided with a flange 27 which limits the upward movement of the ring gear 20. As shown in FIGURE 1, the mechanism 10 is in its lowermost position since the ring gear 20 is juxtaposed to and in abutting contact with the flange 27.

The top cylinder cap 26 is fixedly secured at its lowermost end to the uppermost end of the cylinder 28 in any convenient manner such as by bolts (not shown). Since the top cylinder cap 26 and the cylinder 28 are fixed together, they move as a unit. The lowermost end of the cylinder 28 is closed by a bottom cylinder cap 30 which is fixed to the cylinder 28 by a bolt 32 as shown more clearly in FIGURE 1.

A coolant passage 34 extends through the bottom cylinder cap 30. The coolant passage 34 enters the bottom cylinder cap 30 from a radial direction and makes a ninety degree turn so as to emerge through the uppermost surface of the bottom cylinder cap 30 within the cylinder 28. A coolant tube 36 has its lowermost end disposed within the axially extending portion of the coolant passage 34. A tubular piston rod 38 surrounds the coolant tube 36. The lowermost end of the piston rod 38 is fixedly secured to an annular piston 40 in any convenient manner such as by welding 42. The lowermost end of the piston rod 38 lies in the same plane as the lowermost surface of the piston 40.

The piston 40 is provided with an angular groove 44 on its lowermost surface. A fluid passage 46 extends through the bottom cap 30 and emerges through the uppermost surface of the bottom cap 30 within the confines of the groove 44. The piston 40 is provided with a plurality of piston rings 50 on its outermost surface for contact with the inner peripheral wall of the bore within the cylinder 28. A bushing 52 is disposed within a counterbore at the lowermost end of the piston rod 38. The bushing 52 is fixedly secured within the counterbore in the piston rod 38 by a snap ring 54. The bushing 52 is provided with an O-ring on its inner peripheral surface so as to provide a fluid tight seal between the piston rod 38 and the outer peripheral surface of the coolant tube 36.

The top cylinder cap 26 is provided at its lowermost end with a horizontally disposed bottom wall 56. The bottom wall 56 is provided with an axial bore having a stepped shoulder on which is disposed a bushing 58. The bushing 58 is provided with a groove on its inner peripheral surface. An O-ring 60 is disposed within the groove on the bushing 58 so as to provide a fluid tight seal between the bushing 58 and the outer peripheral surface of the piston rod 38. It will be noted that the piston rod 38 is provided with an axial passage coincident with the passage extending through the coolant tube 36.

The uppermost end of the piston rod 38 is provided with a series of stepped shoulders. A washer 62 is disposed on the lowermost shoulder at the upper end of the piston rod 38. Split rings 64 maintain the washer 62 on the upper end of the piston rod 38 and support the plunger 66. A coolant nipple 68 is disposed within the plunger 66 and is maintained in abutting contact with the uppermost end of the piston rod 38 by split rings 64. The coolant nipple 68 is provided with an axial passage coincident with the passage extending through the piston rod 38.

The mechanism is provided with a plunger positioner 70 so that the plunger 66 will be brought to a predetermined loading position when making glassware by the press-and-blow method. The plunger positioner unit 70 comprises a cylindrical body 72 having a first shoulder 74 which is in abutting contact with the uppermost end of the top cylinder cap 26. The cylindrical body 72 is provided with a second shoulder 76 and a tubular extension 78. A spring guide sleeve 80 surrounds the tubular extension 78. The spring guide sleeve 80 is provided with a flange 82. The spring 84 surrounds the spring guide sleeve 80 and is disposed between the flange 82 and a ring 86 which is fixedly secured to the lowermost end of the tubular extension 78 by a screw 88.

As seen more clearly in FIGURES 4 and 5, the spring guide sleeve 80 is provided at its lowermost end with a pair of integral arms 90 whose ends are connected by arcuate portions 92 thereby defining a hole 94. The uppermost end of the piston rod 38 extends through the hole 94 and the washer 62 abuts the uppermost surface of the arms 90 and the arcuate portions 92 so that downward movement of the plunger 66 causes the spring 84 to be compressed.

A removable guide sleeve 96 is disposed within the tubular extension 78. The inner peripheral surface of the sleeve 96 corresponds with a particular plunger. If glassware having a larger diameter is required, the sleeve 96 may be removed. The sleeve 96 is provided with an annular flange 98 which is disposed within a recess 100 in the cylindrical body 72. If the sleeve 96 is removed, an annular ring will be positioned within the recess 100.

As seen more clearly in FIGURE 4, the lowermost end of the tubular extension 78 is provided with an axially extending pair of slots 102 (only one slot is shown). The lowermost end of the sleeve 96 is also provided with a slot 104 coextensive with the slot 102. The arms 90 on the spring guide sleeve 80 extend through the slots 102 and 104 and are guided thereby. A plurality of passages 108 (only one is shown) extend through the flange 98 on the sleeve 96. The passages 108 extend to a plurality of oil wicks 110 (only one is shown) in the cylindrical body 72. The oil wicks 110 provide a means for lubricating the inner peripheral surface of the spring guide sleeve 80 and the outer peripheral surface of the tubular extension 78. The removable guide sleeve 96 is fixedly secured to the cylindrical body 72 by a bolt positioner 106 which performs an additional function to be made clear hereinafter.

As shown more clearly in FIGURE 1, the top cylinder cap 26 is provided with an axially extending bore 112 which receives an indicator rod 114. The indicator rod 114 is provided with a head biased to the position shown in FIGURE 1 by the spring 115. The indicator rod head is provided with a pin 116 adapted to contact the uppermost surface of piston 40 when said piston 40 is in its uppermost position. When the piston 40 is in its uppermost position, the upper end of the rod 114 is visible through the port 118. The top cylinder cap 26 is provided with an exhaust port 120, the purpose of which will be made clear hereinafter.

Figure 2:
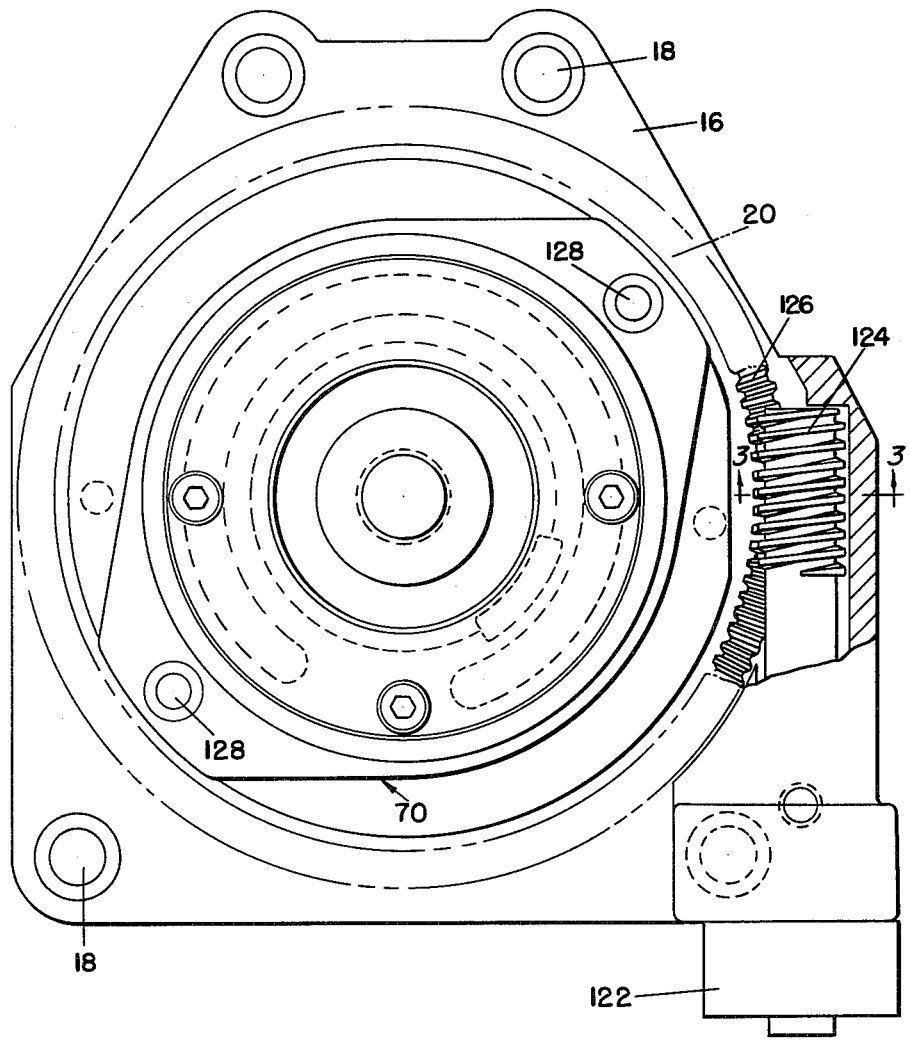
FIGURE 2 is a top plan view of the mechanism shown in FIGURE 1 with portions broken away for clarity of illustration.
Figure 3:
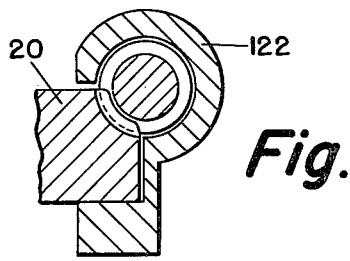
FIGURE 3 is a sectional view taken along the lines 3—3 in FIGURE 2.

As shown more clearly in FIGURES 2 and 3, the plunger plate 16 includes a housing 122 which receives a worm gear 124. The outer peripheral upper corner of the ring gear 20 is provided with teeth 126 meshingly engaged with the teeth on the worm gear 124.

The plunger positioner unit 70 is fixedly secured to the top cylinder cap 26 by a pair of threaded bolts as shown more clearly in FIGURE 2. The bolts 128 extend through a countersunk bore in the cylindrical body 72 as shown more clearly in FIGURE 4. To remove the plunger positioner unit 70, it is only necesasry to remove the bolts 128 and exert an upward pull on the plunger positioner unit 70.

When it is deisred to utilize the plunger mechanism 10 in a blow-and-blow operation, the plunger positioner unit 70 is readily removed and a quick change unit 130 is substituted therefor.

The quick change unit 130, as shown more clearly in FIGURE 6, includes a tubular extension body 132 fixedly secured to a cylindrical body 134 by a threaded bolt 136. The cylindrical body 134 is provided with a shoulder 138 which is in abutting contact with the uppermost end of the top cylinder cap 26. The quick change unit 130 is removably secured to the top cylinder cap 26 by the bolts 128 which formerly retained the plunger positioner unit 70.

The lowermost end of the tubular extension body 132 is spaced from the uppermost surface of the wall 56 on the top cylinder cap 26 and is provided with a limit stop 140. The limit stop 140 determines the lowermost position of a hub 142 which is in abutting contact with the uppermost end of the piston rod 38. There is no direct mechanical connection between the upper end of the piston rod 38 and the hub 142. The hub 142 is provided with a hollow tubular rod 144 which extends through an axial hole in wall 146 on the tubular extension body 132. A spring 148 extends between the lowermost surface of the wall 146 and the hub 142, thereby biasing said hub 142 toward the limit stop 140. A neck pin 150 is fixedly secured to the upper end of the tubular rod 144 by a pair of split rings. A thimble 152 is fixedly secured to a piston rod 154, which surrounds the tubular rod 142, by a pair of split rings. The lowermost end of the piston rod 154 is integral with a piston 156 which is reciprocally mounted within the tubular extension body 132 above the wall 146.

The uppermost surface of the wall 146 is provided with a groove 158. The groove 158 is in fluid communication with an axially extending passage 160 in the tubular extension body 132. The passage 160 is in fluid communication with a passage 164 in the cylindrical body 134. The passage 164 is in fluid communication with an axially extending passage 162 in the top cylinder cap 26.

The passage 162 is in communication with a source of fluid under pressure for raising the piston 156. When the pressure below the piston 156 is relieved, the piston 156 is biased to a lowermost position by a spring 166 extending between the cylindrical body 134 and the piston 156. A conventional blow-and-blow neck mold 168 is disposed on the uppermost surface of the quick change unit 130.

The apparatus for forming glassware of the present invention is utilized in the following manner:

When the plunger mechanism 10 of the present invention is being used in the manufacture of glassware by the press-and-blow method, means are provided to close the blank molds on the neck ring molds which are disposed above the plunger positioner unit 70. Immediately thereafter, glass charges enter the molds and are positioned by a baffle actuating mechanism as is conventional in the art. Thereafter, pressurized fluid is admitted into the cylinder 28 through the passage 46 to raise the plunger 66 which presses the glass charges into blanks. Pressurized fluid is admitted into the cylinder 28 immediately below the wall 56 by a port (not shown) for moving the piston 40 to the position shown in FIGURE 1.

As the plunger 66 moves from the position shown in FIGURE 1 to a position where in the pressed blanks are being removed to a blow mold station (not shown), the spring 84 expands until the flange 82 on the spring guide sleeve 80 abuts the lowermost end of the bolt positioner 106. When pressure is supplied to the cylinder 28 above the piston 40 so that the piston 40 is in its lowermost position as shown in FIGURE 1, the washer 62 engages the arms 90 thereby causing the spring 84 to be compressed as shown in FIGURE 1.

When the pressure above the piston 40 is relieved, the spring 84 expands until the flange 82 abuts the bolt positioner 106. Thereafter, the plunger 66 will be activated to form a second glass charge in the manner set forth above. Adjustment of the bolt positioner 106 results in an adjustment of the loading position of the plunger 66.

When it is desired to convert the mechanism 10 of the present invention so as to produce narrow-neck glassware by the blow-and-blow method, the plunger positioner unit 70 is removed by unthreading the bolts 128 and the quick change unit 130 is substituted therefor. The bolts 128 are utilized in retaining the quick change unit 130 in assembled position within the top cylinder cap 26. Thereafter, the mechanism 10 is in condition for producing narrow-neck glassware by the blow-and-blow method. The conversion apparatus of the present invention utilizes a cartridge means removable as a unit and is therefore quick and capable of being performed by unskilled labor. As used hereinafter, the plunger positioner unit 70 and the quick change unit 130 may be referred to as cartridge means.

When the mechanism 10 of the present invention has been converted to the structure shown in FIGURE 6, narrow-neck glassware will be manufactured in accordance with methods well known in the art. The apparatus shown in FIGURE 6 is in the settle blow position wherein the neck of the glassware is being formed. In this position, the piston 40 has been raised vertically by the pressure of the fluid admitted through the passage 46 and the chamber below piston 156 is in communication with a source of pressurized fluid. When the pressure below piston 40 is relieved, the spring 148 will expand and thereby move the neck pin 150 to the counterblow position. In the counterblow position, the hub 142 will be in abutting contact with the limit stop 140. Also, counterblow fluid from passage 34 will be directed through the bores of the piston rod 38 and the tubular rod 144 to the neck pin 150.

When the pressure below the piston 156 is relieved, the spring 166 will expand and thereby move the thimble 152 to the inverting position. In the inverting position, the piston 156 will be in abutting contact with the uppermost surface of the wall 146. The significance of the settle blow, counterblow, and inverting positions of the neck pin 150 and the corresponding effect on the formation of glassware will be readily apparent to those skilled in the art.

As pointed out above, the mechanism 10 of the present invention has a stroke which is appreciably greater than the stroke of the plunger in devices used by the glassware industry heretofore. The present invention is a single gob plunger mechanism of the type shown in Patent 2,508,890 and is capable of being utilized in place of the mechanism shown in FIGURE 1 of said last mentioned patent. The present invention attains an appreciably greater length of stroke by a plurality of factors including the novel ring gear for adjusting the vertical position of the cylinder 28, by positioning the plunger 66 and its nipple 68 in abutting contact with the upper end of the piston rod 38, by fixing the piston 40 to the lowermost end of the piston rod 38 so that the entire mechanism below the bottom cap 8 in said last mentioned patent may be eliminated. By making the lowermost end of the piston rod 38 in the same plane as the lowermost surface of the piston 40, the pressing pressure of the plunger has been increased over the pressing plunger pressure in said last mentioned patent since the area against which the pressure acts for raising the piston has been increased by the thickness of the piston rod 25 in said last mentioned patent.

The mechanism 10 of the present invention is provided with a radial float so that the plunger may be self-accommodating with respect to its mold. The radial float is provided by the difference between the external diameter of the top cylinder cap 26 and the diameter of the hole in the plunger plate 16 through which the top cylinder cap 26 extends. A radial float is not attainable in said last mentioned patent since the cylinder 7 in said last mentioned patent tilts about the stud 3 rather than floats in a radial direction as does the present invention.

The coolant fluid delivered to the piston rod 38 by the coolant passage 34 is exhausted through the passage 120. The lowermost end of the plunger positioner unit 70 is spaced from the uppermost surface of the wall 56 on the top cylinder cap 26 so that the exhaust passage 120 may be in communication with the space between the plunger 66 and the nipple 68 by way of a hole through the washer 62 and the split rings 64.

Since the cylindrical body 72 on the plunger positioner unit 70 is not provided with a connecting passage, the presence of the passage 162 does not interfere with the forming of glassware by a press-and-blow operation. Since the plunger positioner unit 70 and the quick change unit 130 are a self-contained cartridge means removable as a unit, and since they have the same external dimensions, the plunger mechanism 10 of the present invention may be readily converted from a press-and-blow method to a blow-and-blow method.

As used hereinafter, the piston 40 may be referred to as an expandable chamber element. The ring gear 20 and the elements associated therewith may be referred to as a means cooperatively engaged with the top cylinder cap 26 for adjusting the cylinder 28 in an axial direction and for supporting the cylinder 28 in depending relation from the frame 12. While said last mentioned means includes a ring gear, it is within the scope of the present invention to support the cylinder 28 in depending relation from the frame 12 and adjust the vertical position of the cylinder 28 by a cam operatively disposed for cooperation with the flange 27 on the top cylinder cap 26.

The present invention may be embodied in other specific forms without departing from the spirit or essential attributes thereof and, accordingly, reference should be made to the appended claims, rather than to the foregoing specification as indicating the scope of the invention.

I claim:

1. In a long stroke single gob glassware forming machine comprising a cylinder, an expandable chamber element in said cylinder, a reciprocally mounted rod within said cylinder connected at one end to said element, fluid pressure means operatively associated with said cylinder for reciprocating said rod, a bottom cylinder cap on one end of said cylinder, a top cylinder cap fixedly secured to the other end of said cylinder, means operatively associated with said top cylinder cap for adjusting said cylinder in an axial direction, a cartridge means removable from and insertable into said top cylinder cap as a unit, said cartridge means cooperating with the other end of said rod to selectively utilize said rod in a press-and-blow operation and convert the same so that a blow-and-blow operation may be performed.

2. In a machine in accordance with claim 1 wherein said cartridge means includes a tubular extension body surrounding the upper end of said rod, an apertured wall in said body, a hub disposed below said wall, a neck pin connected to said hub by an element extending through a hole in said wall, and a piston means above said wall connected to a thimble surrounding said neck pin, and means for selectively reciprocating said piston means.

3. In a machine in accordance with claim 2 wherein said means for selectively reciprocating said piston means includes a spring biasing said piston means toward said wall.

4. In a machine in accordance with claim 3 including a spring means biasing said hub into abutting contact with said other end of said rod.

5. In a machine in accordance with claim 2 wherein said hub is in abutting contact with said other end of said rod and is free from any direct mechanicacl means retaining said hub on said rod.

6. In a glass forming machine comprising a top cylinder cap, interchangeable cartridge units insertable in said cylinder cap as a unit, said cartridge units including a plunger positioner unit which enables said cylinder cap to be used in the production of glassware by the press and blow method and a quick change unit which enables said cylinder cap to be used in the production of glassware by the blow and blow method, and selectively operable means extending around said cylinder cap and cooperable therewith to reciprocate said cylinder cap in an axial direction thereof.

7. In a glass forming machine in accordance with claim 6 wherein said last-mentioned means includes an internally threaded ring gear meshingly engaged with threads on the outer periphery of said top cylinder cap, and gear means coupled to said ring gear for rotating said ring gear.

8. In a glass forming machine in accordance with claim 7 including means to prevent rotary movement of said top cylinder cap while enabling the top cylinder cap to move in an axial direction.

References Cited by the Examiner
UNITED STATES PATENTS

| | | | |
|---|---|---|---|
| 1,325,331 | 12/1919 | Rau | 65—229 |
| 1,668,993 | 5/1928 | Weaver | 65—242 |
| 1,911,119 | 5/1933 | Ingle | 65—167 X |
| 1,929,842 | 10/1933 | Forster | 65—367 |
| 2,309,378 | 1/1943 | Berthold | 65—243 |
| 2,334,653 | 11/1943 | Senkbeil | 65—323 |
| 2,364,741 | 12/1944 | Merchant | 121—46 |
| 2,453,350 | 11/1948 | Stegeman | 121—46 |
| 2,508,890 | 5/1950 | Rowe | 65—158 |
| 2,508,891 | 5/1950 | Rowe | 65—243 |
| 2,619,776 | 12/1952 | Rowe | 65—21 |
| 2,755,597 | 7/1956 | Rowe | 65—167 |
| 2,826,867 | 3/1958 | Nava et al. | 65—229 |
| 2,834,154 | 5/1958 | Koob | 65—229 |
| 2,872,904 | 2/1959 | Van Den Beemt | 121—46 |

DONALL H. SYLVESTER, *Primary Examiner.*

IVAN R. LADY, *Examiner.*